United States Patent
Bedathur Jagannath et al.

(10) Patent No.: US 9,929,909 B2
(45) Date of Patent: Mar. 27, 2018

(54) IDENTIFYING MARGINAL-INFLUENCE MAXIMIZING NODES IN NETWORKS

(71) Applicant: International Business Machines Corporation, Armonk, NY (US)

(72) Inventors: Srikanta Bedathur Jagannath, Delhi (IN); Kalapriya Kannan, Delhi (IN); Karan Rai, Bihar (IN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/840,647

(22) Filed: Aug. 31, 2015

(65) Prior Publication Data

US 2017/0063620 A1 Mar. 2, 2017

(51) Int. Cl.
*H04L 12/24* (2006.01)

(52) U.S. Cl.
CPC .......... *H04L 41/0823* (2013.01); *H04L 41/12* (2013.01)

(58) Field of Classification Search
CPC ...... H04L 41/12; H04L 41/0823; H04L 12/24
See application file for complete search history.

(56) References Cited

U.S. PATENT DOCUMENTS

| | | | |
|---|---|---|---|
| 6,363,378 B1 * | 3/2002 | Conklin | G06F 17/30646 |
| 7,039,642 B1 | 5/2006 | Horvitz et al. | |
| 8,744,911 B2 | 6/2014 | Rohan et al. | |
| 2006/0136428 A1 * | 6/2006 | Syeda-Mahmood | G06F 17/30286 |
| 2012/0185422 A1 * | 7/2012 | Shah | G06F 17/30958 706/47 |
| 2012/0226748 A1 | 9/2012 | Bosworth et al. | |
| 2013/0297589 A1 | 11/2013 | Work et al. | |
| 2014/0095689 A1 * | 4/2014 | Borgs | G06F 17/30958 709/224 |
| 2014/0274246 A1 | 9/2014 | Tsai et al. | |
| 2014/0293810 A1 | 10/2014 | Nema et al. | |

(Continued)

OTHER PUBLICATIONS

Huy Nguyen, "On Budgeted Influence Maximization in Social Networks", IEEE journal on selected areas in communications, vol. 311, No. 6, Jun. 2013.*

(Continued)

*Primary Examiner* — Charles C Jiang
*Assistant Examiner* — Kyaw Z Soe
(74) *Attorney, Agent, or Firm* — Ryan, Mason & Lewis, LLP

(57) ABSTRACT

Methods, systems, and computer program products for identifying marginal-influence maximizing nodes in networks are provided herein. A method includes determining, across a network comprising multiple nodes, one or more target nodes in relation to a query node, wherein said determining comprises calculating a matching score for each of the multiple nodes based on attributes identified in a query associated with the query node; computing a probability associated with each edge in the network that connects two or more of the multiple nodes, wherein the probability comprises the likelihood, given the attributes identified in the query, that a given node is to forward information to a node connected thereto via a given edge; and identifying at least one path from the query node to at least one of the target nodes based on the computed probability associated with each edge in the network.

20 Claims, 7 Drawing Sheets

```
302

Require: Network G(V,E), Query, Query node S, Match-
        ing nodes Set SN, Budget for each Set B_{s_i} for each set
        in SN return Set of MSI
        Set SN = SN_{1...n} ⊂ MS   ▷ Subsets of nodes from the
        Matching Set MS
   2:   for SN_i ∈ SN do
            for i ← 1 to B_{s_i} do
   4:         G_{bl} = ComputeBLScores(G)   ▷ G_{bl} represents
        the graph with the computed B and L for each node
                x = IdentifyTopMarginalInfluencer(G_{bl})
   6:         addToOutput(x)
                Remove x from V ∈ G
   8:         for y|(x,y) ∈ E do
                    Remove (x,y) from E;
  10:         end for
                for y|(y,x) ∈ E do
  12:             Remove (y,x) from E;
                end for
  14:     end for
        end for
```

(56) References Cited

U.S. PATENT DOCUMENTS

2016/0203130 A1* 7/2016 Roque .............. G06F 17/30684
707/741

OTHER PUBLICATIONS

Li et al., "Labeled Influence Maximization in Social Networks for Target Marketing," in Privacy, Security, Risk and Trust (passat), 2011 IEEE Third International Conference on Social Computing (socialcom). IEEE, 2011, pp. 560-563.*

Huy Nguyen, "On Budgeted Influence Maximization in Social Networks", IEEE journal on selected areas in communications, vol. 311 ,No. 6, Jun. 2013.*

Kempe et al., "Maximizing the Spread of Influence Through a Social Network," in Proceedings of the Ninth ACM SIGKDD International Conference on Knowledge Discovery and Data Mining. ACM, 2003, pp. 137-146.

Chen et al., "Efficient Influence Maximization in Social Networks," in Proceedings of the 15th ACM SIGKDD International Conference on Knowledge Discovery and Data Mining. ACM, 2009, pp. 199-208.

Schenkel et al., "Efficient Top-k Querying Over Social-Tagging Networks," in Proceedings of the 31st Annual International ACM SIGIR Conference on Research and Development in Information Retrieval. ACM, 2008, pp. 523-530.

Maniu et al., "Network-Aware Search in Social Tagging Applications: Instance Optimality Versus Efficiency," in Proceedings of the 22nd ACM International Conference on Conference on Information & Knowledge Management. ACM, 2013, pp. 939-948.

Yin et al., "On Top-k Social Web Search," in Proceedings of the 19th ACM International Conference on Information and Knowledge Management. ACM, 2010, pp. 1313-1316.

Zhang et al., "Maximizing the Spread of Positive Influence in Online Social Networks," in Distributed Computing Systems (ICDCS), 2013 IEEE 33rd International Conference on. IEEE, 2013, pp. 317-326.

Li et al., "Influence Diffusion Dynamics and Influence Maximization in Social Networks with Friend and Foe Relationships," in Proceedings of the Sixth ACM International Conference on Web Search and Data Mining. ACM, 2013, pp. 657-666.

Page et al., "The Pagerank Citation Ranking: Bringing Order to the Web." 1998.

Jin et al., "Random Walk Based Inverse Influence Research in Online Social Networks," in High Performance Computing and Communications & 2013 IEEE International Conference on Embedded and Ubiquitous Computing (HPCC EUC), pp. 2206-2213.

* cited by examiner

302

---

Require: Network $G(V,E)$, Query, Query node S, Matching nodes Set SN, Budget for each Set $B_{S_i}$ for each set in SN return Set of MSI
    Set $SN = SN_{1...n} \subset MS$   ▷ Subsets of nodes from the Matching Set MS
2: for $SN_j \in SN$ do
    for $i \leftarrow 1$ to $B_{S_j}$ do
4:       $G_{bl}$ =ComputeBLScores(G)   ▷ $G_{bl}$ represents the graph with the computed B and L for each node
        x= IdentifyTopMarginalInfluencer($G_{bl}$)
6:       addToOutput(x)
        Remove x from $V \in G$
8:       for $y|(x,y) \in E$ do
          Remove (x,y) from E;
10:       end for
      for $y|(y,x) \in E$ do
12:         Remove (y,x) from E;
      end for
14:     end for
    end for

Require: Network G with nodes and edges, Query, Query node, Budget
    return Set of influential nodes for maximum reachability (MTI)
Set S = null
List L = null $_{1...n}$
for $i \leftarrow 1$ to $B_{S_i}$ do
2:    $G_{bl}$ = ComputeBLScores(G);
       x = IdentifyTopInfluence($G_{bl}$)
4:    addToOutput(x)
       Add x to L
6:    while L is non-empty do
        y ← First element of L
8:        Remove y from E
        for z|(y,z) ∈ E do
10:        Remove (y,z) from E
        Add z to L
12:      end for
    end while
14: end for

FIG. 4

IDENTIFYING MARGINAL-INFLUENCE MAXIMIZING NODES IN NETWORKS

FIELD

The present application generally relates to information technology, and, more particularly, to network processing techniques.

BACKGROUND

Attempting to identify, for a given requirement in a given network or graph, a set of target nodes and non-target nodes and leveraging such nodes for further processing includes multiple challenges, particularly in connection with complications from large data sets.

SUMMARY

In one aspect of the present invention, techniques for identifying marginal-influence maximizing nodes in networks are provided. An exemplary computer-implemented method can include steps of determining, across a network comprising multiple nodes, one or more target nodes in relation to a query node, wherein said determining comprises calculating a matching score for each of the multiple nodes based on one or more attributes identified in a query associated with the query node; computing a probability associated with each of multiple edges in the network that connects two or more of the multiple nodes, wherein the probability comprises the likelihood, given the one or more attributes identified in the query, that a given node is to forward information to a node connected thereto via a given edge; and identifying at least one path from the query node to at least one of the one or more target nodes based on the computed probability associated with each of the multiple edges in the network.

In another aspect of the invention, an exemplary computer-implemented method can include steps of determining, across a network comprising multiple nodes, (i) a plurality of target nodes in relation to a query node and (ii) a plurality of non-target nodes in relation to the query node, wherein said determining comprises calculating a matching score for each of the multiple nodes based on one or more attributes identified in a query associated with the query node, and wherein said determining is carried out by a matching algorithm executing on a computing device; calculating a first score for each of the plurality of target nodes and non-target nodes based on a relation of each node to one or more of the plurality of target nodes; calculating a second score for each of the plurality of target nodes and non-target nodes based on a relation of each node to one or more of the plurality of non-target nodes; calculating a composite score for each of the plurality of target nodes and non-target nodes, wherein the composite score comprises the first score subtracted by the second score; and outputting an identification of the one of the plurality of target nodes and non-target nodes having the highest composite score.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating an algorithm implemented according to an example embodiment of the invention;

FIG. 4 is a diagram illustrating an algorithm implemented according to an example embodiment of the invention;

DETAILED DESCRIPTION

Figure 1:
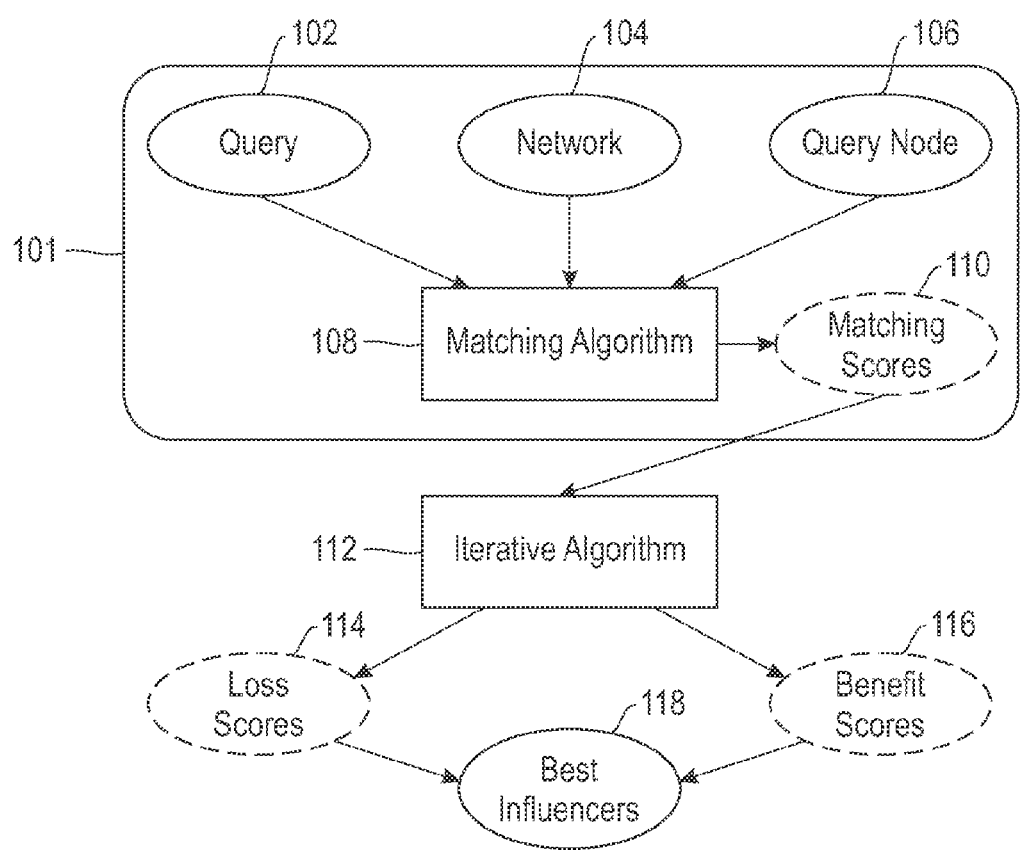
FIG. 1 is a diagram illustrating system architecture, according to an example embodiment of the invention.

As described herein, an aspect of the present invention includes identifying marginal-influence maximizing nodes in target labeled networks. At least one embodiment of the invention includes selecting an influencer to approach a target candidate (for example, in a recruitment process) by deriving benefit and/or loss scores from target and/or non-target nodes and computing influencer scores based on neighbor scores (benefit and loss scores).

As used herein, an "influencer" refers to an individual in a given network with whom the target candidate is in high communication. Accordingly, information recommended by the influencer has a very high chance of being considered seriously by the target candidate. Further, as used herein, a "target candidate" can refer to an individual in a given network whose profile closely matches a description and one or more requirements of a given act. Additionally, as used herein, "approach" refers to an act of an entity in the network. By way of example, a recruiter may carry out an approach by sending an open employment position advertisement to a potential candidate.

As used herein, a benefit score measures the level of benefit (for example, reachability to given target nodes) and a loss score measures the level of loss (for example, reachability to non-target nodes). As detailed herein, benefit scores and loss scores can be propagated through iterations and provide a mechanism for computing a ranked order of influencers.

Additionally, one or more embodiments of the invention includes identifying marginal influencers that can increase the reachability to target nodes and minimize reachability to non-target nodes. Further, at least one embodiment of the invention can also include identifying influencers that can help identify candidates that match one or more requirements in a query description (such as a job description, for example), as well as identifying a path to such candidates.

As described herein, given a directed network G=(V, E) (wherein V represents a set of vertices or nodes, and wherein E represents a set of edges between those vertices of nodes), a query node Q, and a query, at least one embodiment of the invention includes determining the top ranking nodes in the network near the query node that maximize the quality of influenced nodes with respect to the query. As used in this context, "quality" refers to the gap between the likelihood of reaching matching nodes (or target candidates) and the likelihood of reaching non-matching nodes in the network.

Also, associated with each vertex in V is a body of text and/or an attribute set which can be utilized for matching. Maximizing the quality of influenced nodes includes maximizing the likelihood of reaching matching nodes while minimizing the likelihood of reaching non-matching nodes. Accordingly, there is a probability P(i,j) associated with each edge which denotes a transition probability. The transition probability represents the likelihood, given any information, that a given node (i) is to forward the information to its neighboring node (j).

As noted above and further detailed herein, a benefit score refers to the influence score of a node derived from the target nodes in a given network, and a loss score refers to the influence score of a node derived from the non-target nodes in a given network. As also described herein, one or more embodiments of the invention include implementing an iterative approach to propagate benefit scores and loss scores. At each stage of such an iterative approach, the benefit scores and loss scores are computed based on the benefit scores and loss scores of one or more neighbors of the given node, and the values converge when no additional new scores need to be included in the computation of these scores (that is, the values converge when the new score computed no longer deviates from the previous score assigned to the node).

FIG. 1 is a diagram illustrating system architecture, according to an embodiment of the invention. By way of illustration, FIG. 1 depicts system 101, which includes a query 102, a network 104, and a query node 106, all of which provide input to a matching algorithm component 108. In at least one embodiment of the invention, the matching algorithm component 108 outputs matching scores 110, which are provided to an iterative algorithm component 112. The iterative algorithm component 112 outputs loss scores 114 and benefit scores 116, which are used to determine (and output) the one or more best influencers 118.

The query 102 provides or identifies textual information and/or attributes that are desired. Such textual information and/or attributes are matched, via matching algorithm 108, against the other nodes in the network 104 to provide a matching score 110 for each node in the network 104. Query node 106 can represent an entity such as, for example, a recruiter who is setting matching scores to target candidates. For instance, the query node 106 can assign different weights to the various query categories to identify/score various candidates.

In at least one example embodiment of the invention, the matching scores are normalized between zero and one. Additionally, in such an embodiment, a score of zero is given for nodes that do not match. A matching score for node i can be referred to as M[i], and the matching score is calculated based on the number of desired attributes that are present in the node attribute set.

Further, as also illustrated in FIG. 1, benefit scores 116 are determined for each node. As detailed herein, a benefit score represents the amount of influence that a node has, with respect to the matching nodes. By way of example, B[i] can denote the benefit score for node i, and such a score can be defined in a recursive manner as follows:

$$B[i] = \lambda * \delta(i) + (1 - \lambda) * \sum_{(i,j) \in E} P(i, j) * (\alpha * B[j] + (1 - \alpha) * M[j])$$

$$\delta(i) = \begin{cases} 1: & i = querynode \\ 0: & o.w. \end{cases}$$

As used above, B[i] is an indicator variable to mark whether the node i is the query node or not; lambda is a default probability mass that is given as the benefit score of the query node; P(i, j) is the probability strength on the edge, if it exists, between a node i and another node j in the network; M[j] is the matching score assigned to the node j with respect to the query posted by the query node; and alpha is the preference parameter which determines whether there exists a willingness to give high preference to the benefit score of the node j or the matching score of the node j. By way of example, if influencers are sought who link only good target candidates, then alpha would be set to a low value; but if influencers who also link to other good influencers are sought, then alpha would be set to a higher value. Nevertheless, in one or more embodiments of the invention, 0≤alpha≤1.

Also, similar to the benefit scores, at least one embodiment of the invention also includes defining a loss score for each node. As also detailed herein, a loss score represents how many bad or undesirable matches (that is, nodes which did not meet parameters of the employment advertisement (or have no matching score)) are present in the vicinity of the node. By way of example, L[i] can denote the loss score for node i, which can be defined as follows:

$$L[i] = \sum_{(i,j) \in E} P(i, j) * (\beta * L[j] + (1 - \beta) * (1 - M[j]))$$

In addition to the variables defined above, in the noted equation, beta is the preference parameter which determines the willingness to give high preference to the loss score of node j or the "non-matching" score of node j.

In one or more embodiments of the invention, bias of the query node 106 is being added only in the benefit score as closeness to query node 106 provides an advantage to any node. As noted above, at least one embodiment of the invention includes implementing an iterative approach for calculation of the benefit scores and the loss scores. In such an embodiment, the benefit scores and the loss scores can be initialized to zero, and the calculation of scores can subsequently be carried out over the entire graph in each iteration. In an example embodiment, as soon as the root-mean-square (RMS) percentage error falls below one percent, the iterative process is stopped.

Once all of the nodes have been assigned benefit and loss scores, at least one embodiment of the invention includes ranking the nodes. It is desirable, in one or more implementations, for a given node to have a high benefit score and a low loss score. Accordingly, one or more embodiments of the invention include calculating and utilizing a composite score for each given node i, which can be represented by B[i]-L[i], to rank the nodes and identify and/or provide the top ranking influential node(s). The top-ranking influential node(s) is/are suggested to the query node (for example, the recruiter) as the entities to be contacted first for finding candidate entities in the network.

To compare and rank-order candidate nodes with respect to a given desired attribute set, at least one embodiment of the invention includes separately computed a score for each attribute and combining the scores into a normalized score between zero and one (that is, the entire attribute set will have a normalized score between zero and one). By way of example, for a set of desired skills or roles, the score is computed as the number of desired skills that the candidate possesses over the total number of desired skills. For numerical values such as, for example, experience, the score is computed to be one for the desired range and decreased as the values move out of the desired range.

By way of example, consider a situation wherein it is desired to fill an employment position, preferably with candidates who have no less than five years of experience but no more than fifteen years of experience. As such, if there exists a highly qualified candidate with only four years of experience, he or she may also be considered, but if similarly qualified candidate with greater amounts of experience are found, they are to be preferred.

For a variable such as education, the score can be computed by comparing degrees and determining how closely such degrees are connected (from a pre-generated database, for example). After all of the individual scores are computed, the individual scores are combined using different weights for each attribute, as desired and/or predetermined by the user. This resulting combined score represents the matching score of the candidate against a job description attribute set.

Figure 2:
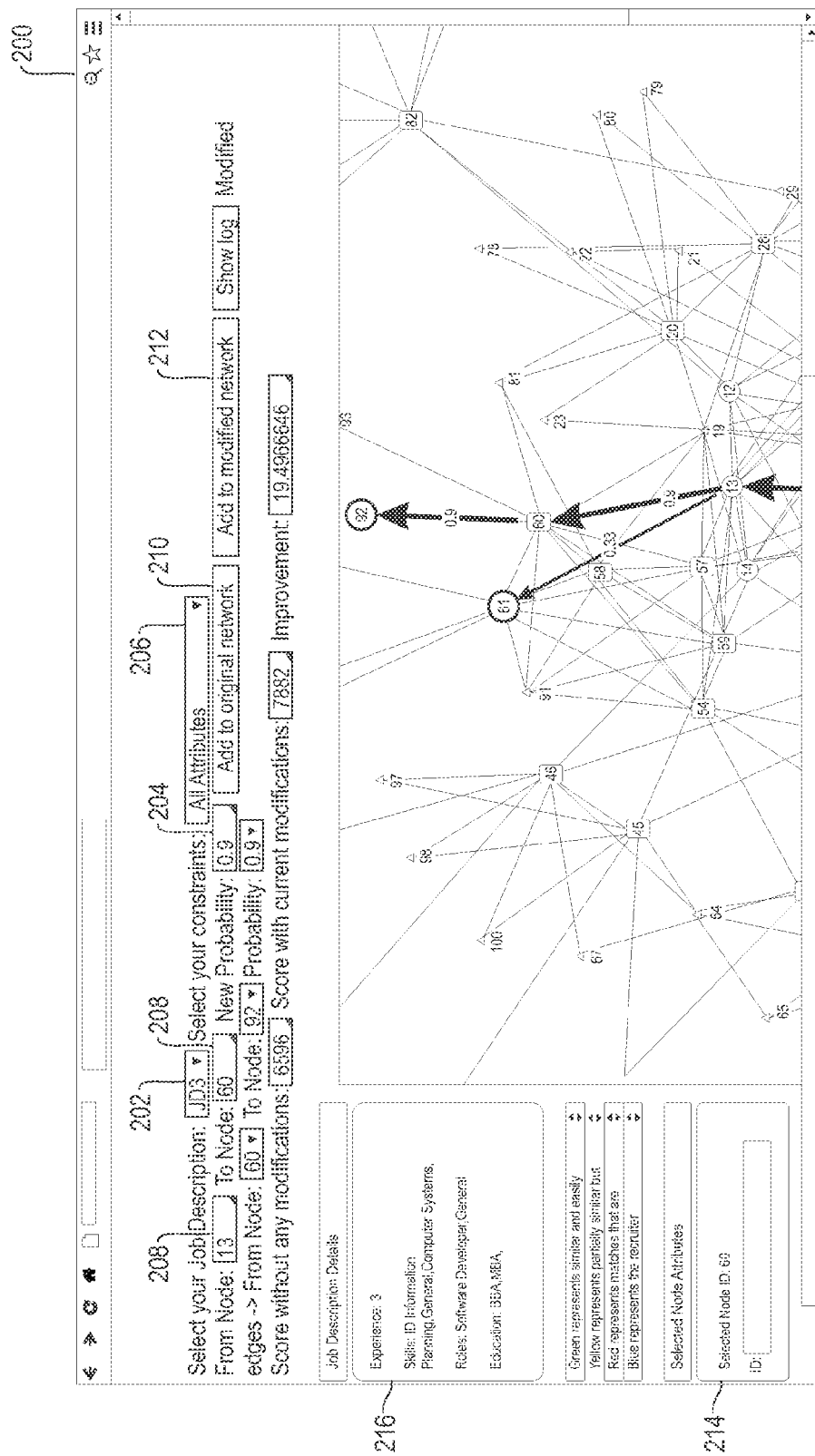
FIG. 2 is a diagram illustrating an example implementation interface dashboard, according to an example embodiment of the invention.

FIG. 2 is a diagram illustrating an example implementation interface dashboard 200, according to an example embodiment of the invention. By way of illustration, FIG. 2 depicts the example dashboard 200, which includes multiple configurable queries and/or components. For example, dashboard 200 includes a job description selection option 202, a network property 204 for a given link strength, and an attribute filtering option 206 (which can offer options such as "All attributes," "Only skills," "Only roles," "Only education," "Skills and education," "Experience and education," "Experience, skills, and education," etc.). Additionally, as also depicted in FIG. 2, dashboard 200 includes a node specification option 208, an addition of new properties to an original network option 210, and an addition of new properties to a modified network option 212. Example "properties" can include the probabilities between two nodes in the network that can be added/modified from the original network. Further, dashboard 200 includes a selected node attributes component 214 and a job description details component 216.

An example implementation of dashboard 200 in connection with one or more embodiments of the invention can include a manager and/or recruiter use case, wherein the manager and/or recruiter selects job descriptions (via component 216) to determine information pertaining to a particular candidate (via component 214) and additionally determine how to reach such a candidate via analysis of the nodes. For instance, certain nodes (representing candidates) can be identified as matching (that is, the candidate matches the job description) but not reachable, while other nodes can be identified as matching and reachable. By way of example, if there is a chain of connections from a node S to node T, then node T is referred to as reachable from node S. In one or more embodiments of the invention, the network determines if a node is reachable or not. Also, a node which may be matching may not be reachable form the query node or a manager node.

Another example implementation of dashboard 200 in connection with one or more embodiments of the invention can include an employee and/or job seeker use case, wherein employee and/or job seeker can leverage his or her own professional details to identify recruiters (that is, recruiter nodes) in the given network as well as how to reach such recruiters.

Additionally, as noted above, given a directed network G=(V, E), a query node Q and a query, at least one embodiment of the invention includes determining the top ranking node(s) in the network near to the query node that maximize the quality of influenced nodes with respect to the query. As also noted herein, with each vertex in V, there is associated a body of text and/or an attribute set which allows for matching.

FIG. 3 is a diagram illustrating an algorithm implemented according to an example embodiment of the invention. Algorithm 302 can be implemented, for example, when more than one influencer is needed to reach given target nodes given a budget for communication.

Algorithm 302 can be implemented to determine the top-k marginal influencers (MIs) for a given set of target nodes, such that the target nodes are reached by as many high-scoring marginal influencers as possible. By way of illustration and example, in maximizing a strength of influence computation, consider a recruitment network in which there are a set of matching nodes whose matching scores are high. In such an example, consider also that a recruiter would like to identify a set of nodes that will increase the probability of the job description reaching the matching nodes. Also, consider that it is likely that such matching nodes can be reached through several MIs. As such, it would be desired to identify a set of MI nodes from the list of MIs for each such set of matching nodes. In connection with algorithm 302, let the set of matching nodes identified by Q be $SN_1 \ldots SN_n$, in which each $SN_i \in i$, and represents a sub-set of nodes from the set of matching nodes. For each $SN_i$, it is desired to maximize the possibility of reaching the nodes. That is, it is desired that the matching nodes can be reached via more than one path, which increases the chances of information reaching them.

FIG. 4 is a diagram illustrating an algorithm implemented according to an example embodiment of the invention. Algorithm 402 can be implemented, for example, when multiple given target nodes are desired to be covered given a budget for communication.

Algorithm 402 can be implemented to determine the top-k MIs for a given set of target nodes, such that each target node is reached by at most one (best for the target node) marginal influencer. Accordingly, algorithm 402 can be considered the converse of algorithm 302. As such, and by way of example, consider a scenario of a recruitment network wherein the recruiter prefers to identify different matching nodes in terms of the number of matching nodes. In such a scenario, it is desired to maximize the reach of influence; that is, it is desired to reach as many matching nodes as possible.

Figure 5:
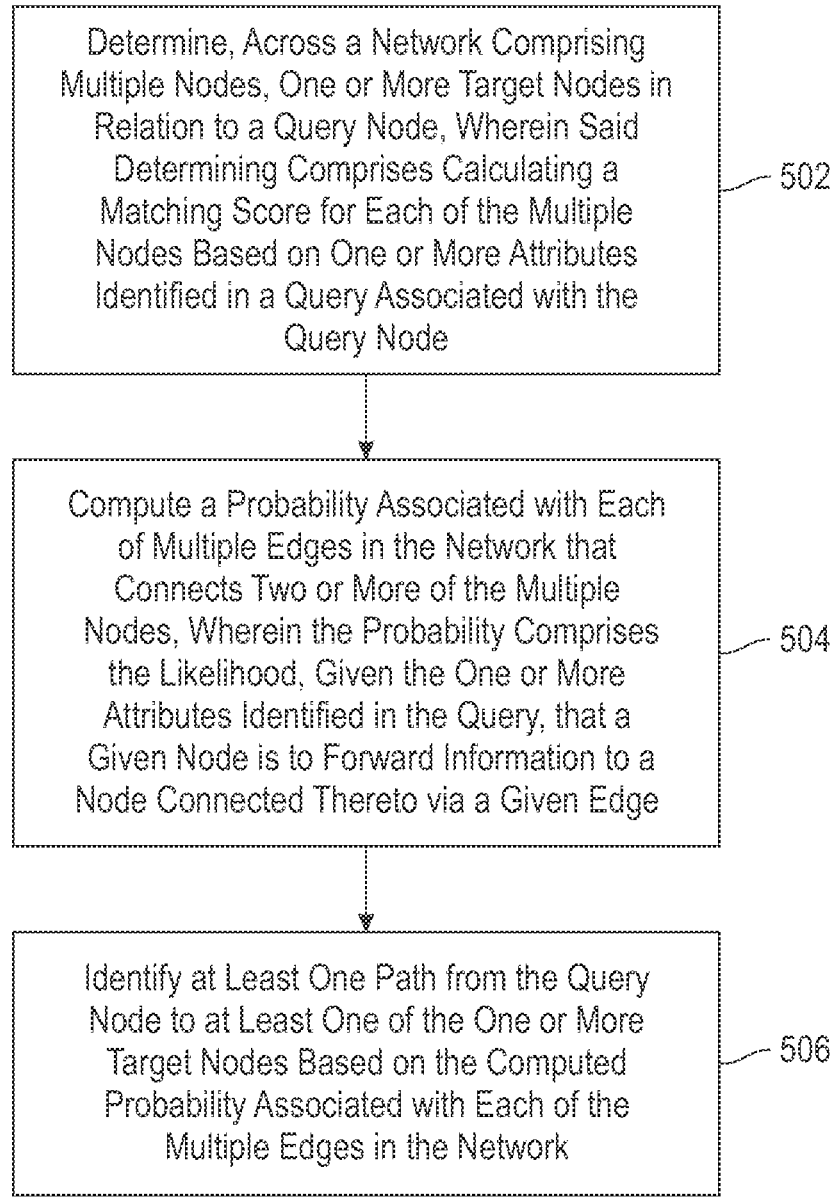
FIG. 5 is a flow diagram illustrating techniques according to an embodiment of the invention.

FIG. 5 is a flow diagram illustrating techniques according to an embodiment of the present invention. Step 502 includes determining, across a network comprising multiple nodes, one or more target nodes in relation to a query node, wherein said determining comprises calculating a matching score for each of the multiple nodes based on one or more attributes identified in a query associated with the query node, and wherein said determining is carried out by a matching algorithm executing on a computing device.

Each of the multiple nodes in the network includes a set of one or more attributes, and, accordingly, the matching score is calculated based on the number of the one or more attributes identified in the query present in the set of one or more attributes associated with each of the multiple nodes in the network.

Additionally, calculating the matching score for each of the multiple nodes based on one or more attributes identified in the query can include applying a weight to each of the one or more attributes identified in the query. In one or more embodiments of the invention, the weight applied to each of the one or more attributes identified in the query is predetermined by a user.

Step 504 includes computing a probability associated with each of multiple edges in the network that connects two or more of the multiple nodes, wherein the probability comprises the likelihood, given the one or more attributes identified in the query, that a given node is to forward information to a node connected thereto via a given edge, and wherein said computing is carried out by an iterative algorithm executing on the computing device. In one or more embodiments of the invention, the probability can include the inverse of the number of messages (that is, an inverse frequency) that have been received by a node from another node. However, it is to be appreciated by one skilled in the art that multiple additional techniques can be implemented to compute the strength of the connection between two edges.

Step 506 includes identifying at least one path from the query node to at least one of the one or more target nodes based on the computed probability associated with each of the multiple edges in the network.

The techniques depicted in FIG. 5 can also include normalizing the matching score for each of the multiple nodes, as well as ranking the matching score for each of the multiple nodes.

Figure 6:
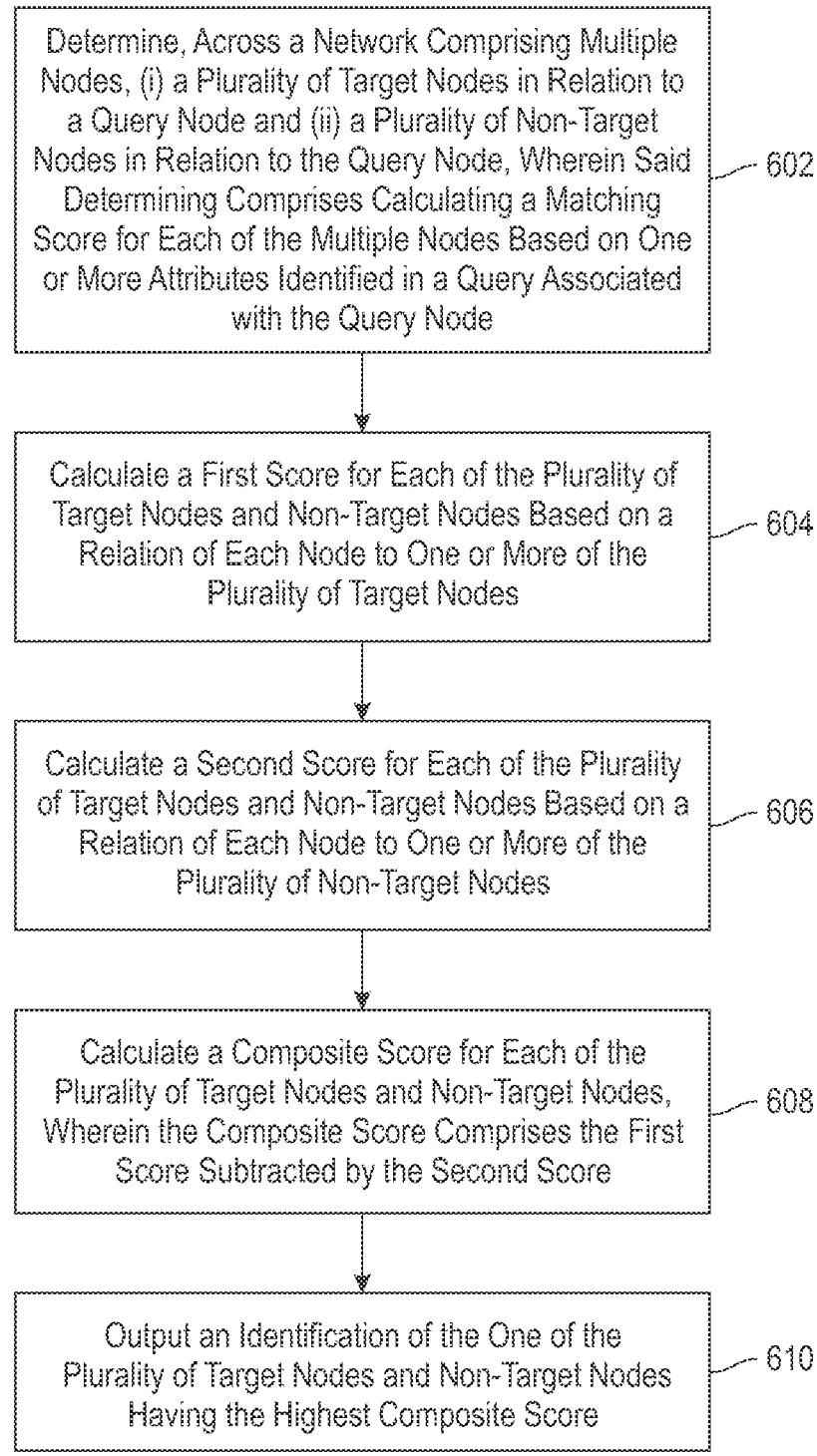
FIG. 6 is a flow diagram illustrating techniques according to an embodiment of the invention.

FIG. 6 is a flow diagram illustrating techniques according to an embodiment of the present invention. Step 602 includes determining, across a network comprising multiple nodes, (i) a plurality of target nodes in relation to a query node and (ii) a plurality of non-target nodes in relation to the query node, wherein said determining comprises calculating a matching score for each of the multiple nodes based on one or more attributes identified in a query associated with the query node, and wherein said determining is carried out by a matching algorithm executing on a computing device.

The matching score can be calculated based on the number of the one or more attributes identified in the query present in a set of one or more attributes associated with each of the multiple nodes in the network. Also, calculating the matching score for each of the multiple nodes based on one or more attributes identified in the query can include applying a weight to each of the one or more attributes identified in the query. In one or more embodiments of the invention, the weight applied to each of the one or more attributes identified in the query is predetermined by a user.

Step 604 includes calculating a first score for each of the plurality of target nodes and non-target nodes based on a relation of each node to one or more of the plurality of target nodes. Step 606 includes calculating a second score for each of the plurality of target nodes and non-target nodes based on a relation of each node to one or more of the plurality of non-target nodes.

Step 608 includes calculating a composite score for each of the plurality of target nodes and non-target nodes, wherein the composite score comprises the first score subtracted by the second score. Step 610 includes outputting an identification of the one of the plurality of target nodes and non-target nodes having the highest composite score.

The techniques depicted in FIG. 6 can also include ranking the plurality of target nodes based on the composite score of each of the plurality of target nodes.

The techniques depicted in FIG. 5 and FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 and FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
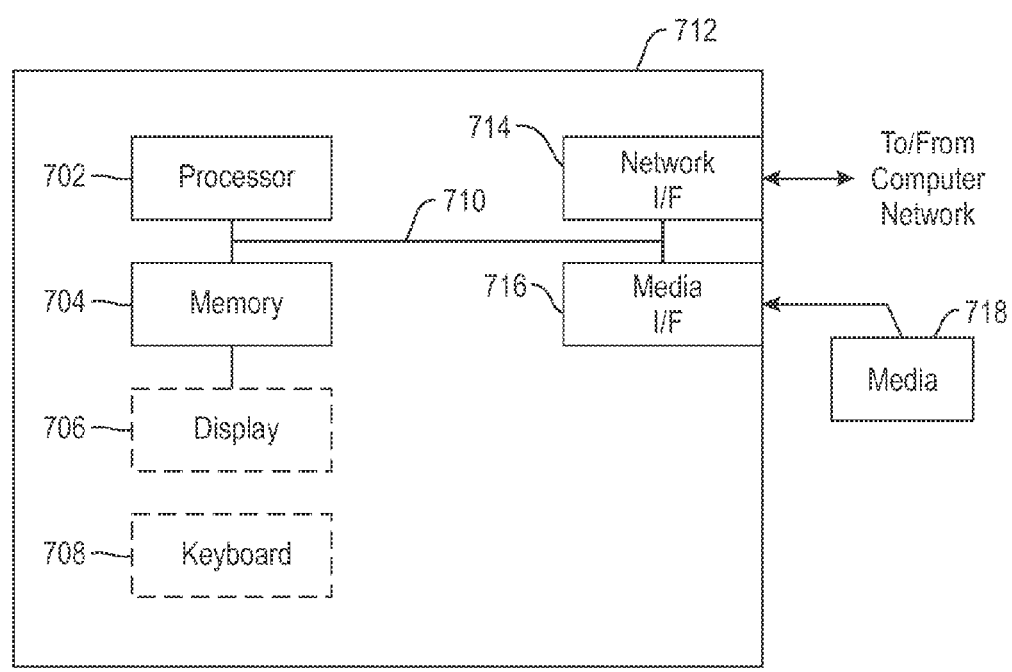
FIG. 7 is a system diagram of an exemplary computer system on which at least one embodiment of the invention can be implemented.

Additionally, an aspect of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712.

Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, determining candidates that match requirements in a given job description and determining a path to the candidates.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, across a network comprising multiple nodes, one or more target nodes in relation to a query node, wherein said determining comprises calculating a matching score for each of the multiple nodes based on one or more attributes identified in a query associated with the query node, and wherein said determining is carried out by a matching algorithm executing on a computing device;
    computing a benefit score for each of the multiple nodes, wherein the benefit score measures the reachability from a given node to the one or more target nodes in the network;
    computing a loss score for each of the multiple nodes, wherein the loss score measures the reachability from a given node to the non-target nodes in the network;
    computing a probability associated with each of multiple edges in the network that connects two or more of the multiple nodes, wherein the probability comprises the probability, given the one or more attributes identified in the query, that a given node is to forward information to a node connected thereto via a given edge, and wherein said computing is carried out by an iterative algorithm executing on the computing device; and
    identifying at least one path from the query node to at least one of the one or more target nodes based on (i) the computed probability associated with each of the multiple edges in the network, (ii) the computed benefit score for each of the multiple nodes in the network, and (iii) the computed loss score for each of the multiple nodes in the network, wherein the at least one path increases reachability from the query node to the one or more target nodes in the network and decreases reachability from the query node to the non-target nodes in the network.

2. The method of claim 1, wherein each of the multiple nodes in the network comprises a set of one or more attributes.

3. The method of claim 2, wherein the matching score is calculated based on the number of the one or more attributes identified in the query present in the set of one or more attributes associated with each of the multiple nodes in the network.

4. The method of claim 1, comprising:
normalizing the matching score for each of the multiple nodes.

5. The method of claim 1, comprising:
ranking the matching score for each of the multiple nodes.

6. The method of claim 1, wherein said calculating the matching score for each of the multiple nodes based on one or more attributes identified in the query comprises applying a weight to each of the one or more attributes identified in the query.

7. The method of claim 6, wherein the weight applied to each of the one or more attributes identified in the query is predetermined by a user.

8. A computer program product, the computer program product comprising a non-transitory computer readable storage medium having program instructions embodied therewith, the program instructions executable by a computing device to cause the computing device to:
determine, across a network comprising multiple nodes, one or more target nodes in relation to a query node, wherein said determining comprises calculating a matching score for each of the multiple nodes based on one or more attributes identified in a query associated with the query node, and wherein said determining is carried out by a matching algorithm executing on the computing device;
compute a benefit score for each of the multiple nodes, wherein the benefit score measures the reachability from a given node to the one or more target nodes in the network;
compute a loss score for each of the multiple nodes, wherein the loss score measures the reachability from a given node to the non-target nodes in the network;
compute a probability associated with each of multiple edges in the network that connects two or more of the multiple nodes, wherein the probability comprises the probability, given the one or more attributes identified in the query, that a given node is to forward information to a node connected thereto via a given edge, and wherein said computing is carried out by an iterative algorithm executing on the computing device; and
identify at least one path from the query node to at least one of the one or more target nodes based on (i) the computed probability associated with each of the multiple edges in the network, (ii) the computed benefit score for each of the multiple nodes in the network, and (iii) the computed loss score for each of the multiple nodes in the network, wherein the at least one path increases reachability from the query node to the one or more target nodes in the network and decreases reachability from the query node to the non-target nodes in the network.

9. The computer program product of claim 8, wherein the program instructions executable by the computing device further cause the computing device to:
rank the matching score for each of the multiple nodes.

10. The computer program product of claim 8, wherein said calculating the matching score for each of the multiple nodes based on one or more attributes identified in the query comprises applying a weight to each of the one or more attributes identified in the query.

11. The computer program product of claim 10, wherein the weight applied to each of the one or more attributes identified in the query is predetermined by a user.

12. A system comprising:
a memory; and
at least one processor coupled to the memory and configured for:
determining, across a network comprising multiple nodes, one or more target nodes in relation to a query node, wherein said determining comprises calculating a matching score for each of the multiple nodes based on one or more attributes identified in a query associated with the query node, and wherein said determining is carried out by a matching algorithm executing on the at least one processor;
computing a benefit score for each of the multiple nodes, wherein the benefit score measures the reachability from a given node to the one or more target nodes in the network;
computing a loss score for each of the multiple nodes, wherein the loss score measures the reachability from a given node to the non-target nodes in the network;
computing a probability associated with each of multiple edges in the network that connects two or more of the multiple nodes, wherein the probability comprises the probability, given the one or more attributes identified in the query, that a given node is to forward information to a node connected thereto via a given edge, and wherein said computing is carried out by an iterative algorithm executing on the at least one processor; and
identifying at least one path from the query node to at least one of the one or more target nodes based on (i) the computed probability associated with each of the multiple edges in the network, (ii) the computed benefit score for each of the multiple nodes in the network, and (iii) the computed loss score for each of the multiple nodes in the network, wherein the at least one path increases reachability from the query node to the one or more target nodes in the network and decreases reachability from the query node to the non-target nodes in the network.

13. The system of claim 12, wherein the at least one processor is further configured for:
ranking the matching score for each of the multiple nodes.

14. The system of claim 12, wherein said calculating the matching score for each of the multiple nodes based on one or more attributes identified in the query comprises applying a weight to each of the one or more attributes identified in the query.

15. The system of claim 14, wherein the weight applied to each of the one or more attributes identified in the query is predetermined by a user.

16. A method, comprising:
determining, across a network comprising multiple nodes, (i) a plurality of target nodes in relation to a query node and (ii) a plurality of non-target nodes in relation to the query node, wherein said determining comprises calculating a matching score for each of the multiple nodes based on one or more attributes identified in a query associated with the query node, and wherein said determining is carried out by a matching algorithm executing on a computing device;
calculating a first score for each of the plurality of target nodes and non-target nodes based on a relation of each node to one or more of the plurality of target nodes, wherein the first score measures the reachability from each node to one or more of the plurality of target nodes in the network;
calculating a second score for each of the plurality of target nodes and non-target nodes based on a relation of each node to one or more of the plurality of non-target nodes, wherein the second score measures the reachability from each node to one or more of the plurality of non-target nodes in the network;

calculating a composite score for each of the plurality of target nodes and non-target nodes, wherein the composite score comprises the first score subtracted by the second score; and outputting an identification of the one of the plurality of target nodes and non-target nodes having the highest composite score, wherein the highest composite score maximizes reachability from the query node to one or more of the target nodes in the network and minimizes reachability from the query node to the non-target nodes in the network.

17. The method of claim 16, wherein the matching score is calculated based on the number of the one or more attributes identified in the query present in a set of one or more attributes associated with each of the multiple nodes in the network.

18. The method of claim 16, wherein said calculating the matching score for each of the multiple nodes based on one or more attributes identified in the query comprises applying a weight to each of the one or more attributes identified in the query.

19. The method of claim 18, wherein the weight applied to each of the one or more attributes identified in the query is predetermined by a user.

20. The method of claim 16, comprising:
ranking the plurality of target nodes based on the composite score of each of the plurality of target nodes.

* * * * *